F. L. FREEMAN.
FRONT WHEEL DRIVE MECHANISM FOR MOTOR VEHICLES.
APPLICATION FILED NOV. 5, 1917.
1,303,285.
Patented May 13, 1919.
2 SHEETS—SHEET 1.
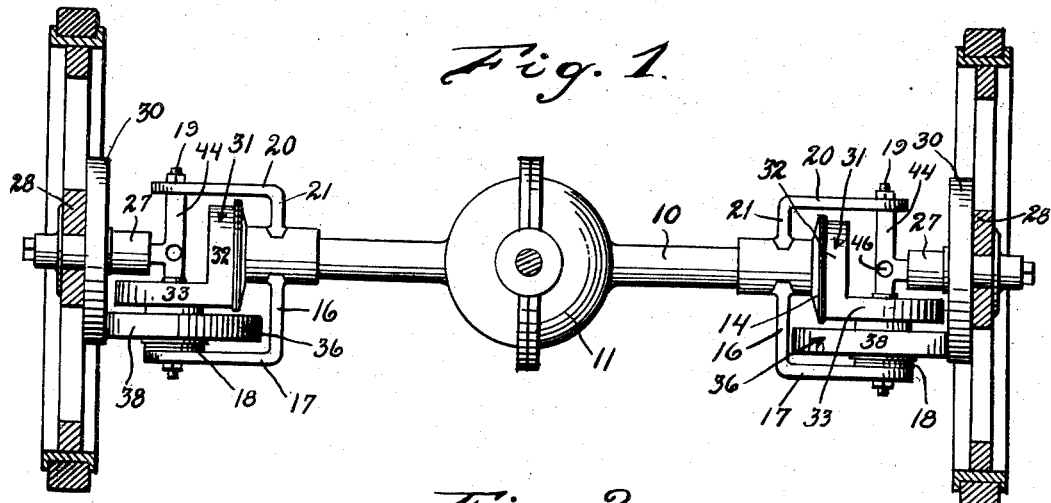
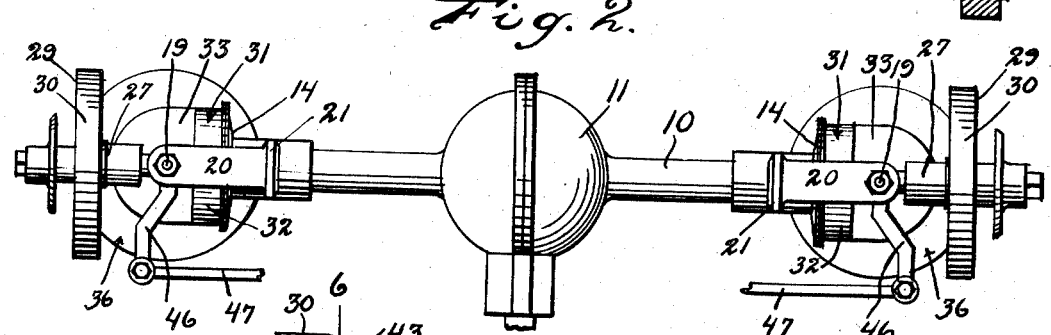
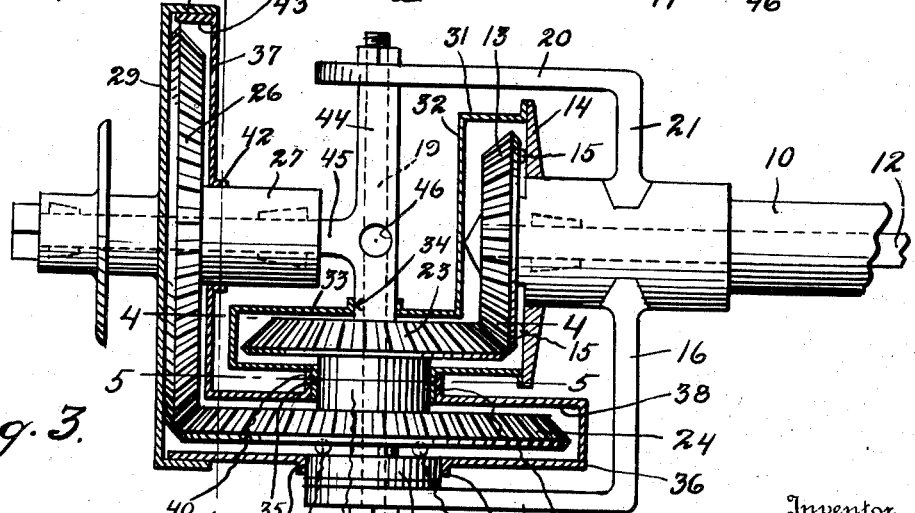

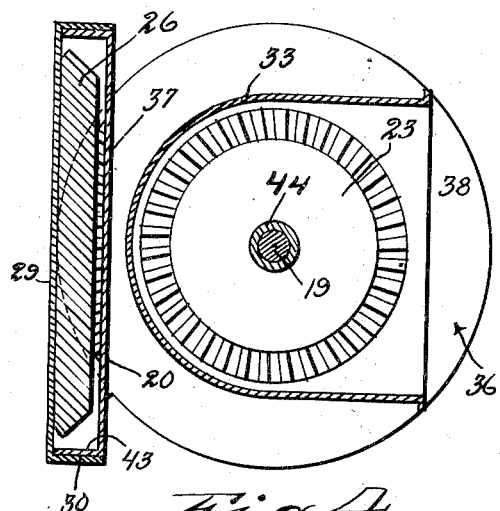
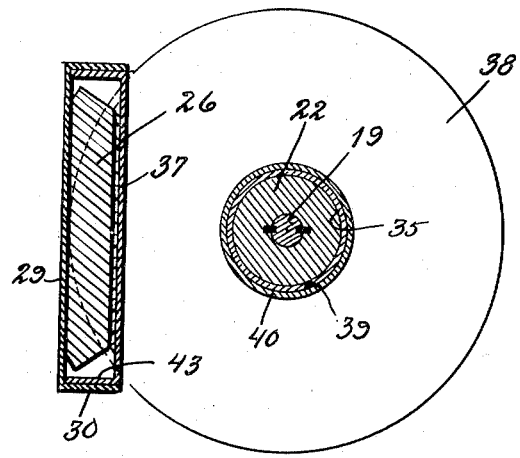
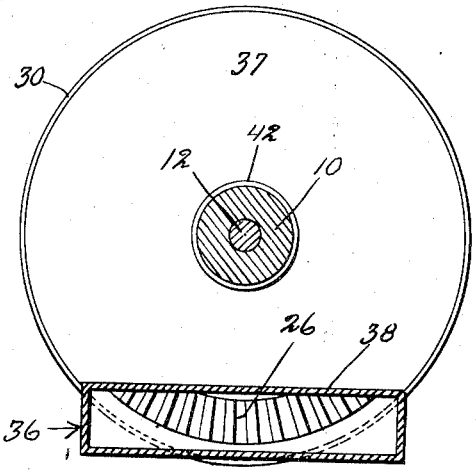
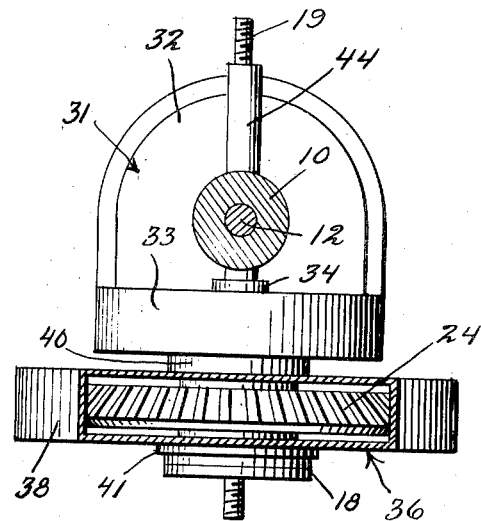
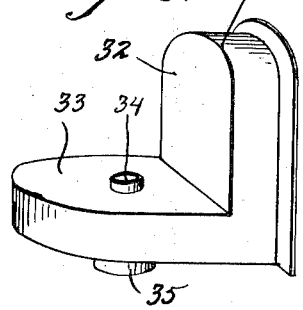

UNITED STATES PATENT OFFICE.

FRANK L. FREEMAN, OF OMAHA, NEBRASKA.

FRONT-WHEEL DRIVE MECHANISM FOR MOTOR-VEHICLES.

1,303,285. Specification of Letters Patent. Patented May 13, 1919.

Application filed November 5, 1917. Serial No. 200,348.

*To all whom it may concern:*

Be it known that I, FRANK L. FREEMAN, a citizen of the United States, residing at Omaha, in the county of Douglas and State of Nebraska, have invented certain new and useful Improvements in Front-Wheel Drive Mechanism for Motor-Vehicles; and I do hereby declare the following to be a full, clear, and exact description of the invention, such as will enable others skilled in the art to which it appertains to make and use the same.

This invention is an improvement in motor vehicles and has particular reference to a front wheel drive therefor.

An object of the invention is to provide an improved mechanism of simple and inexpensive construction by which power may be practically and economically applied to the front wheels of a motor vehicle without interfering with the steering mechanism.

Another object is to provide gearing inclosed by a novel construction and arrangement of housings one of which is movable relative to the other when the steering mechanism is actuated so that the front wheels may be effectively controlled to turn the vehicle in any direction.

The inventive idea involved is capable of receiving a variety of mechanical expressions one of which, for the purpose of illustrating the invention is shown in the accompanying drawings, wherein:—

Figure 1 is a rear elevation of the front axle of a motor vehicle showing the invention applied.

Fig. 2 is a top plan view.

Fig. 3 is an enlarged fragmentary longitudinal section.

Fig. 4 is a section on line 4—4 of Fig. 3.

Fig. 5 is a section on line 5—5 of Fig. 3.

Fig. 6 is a section on the line 6—6 of Fig. 3 looking in one direction.

Fig. 7 is a section on the same line looking in the opposite direction.

Fig. 8 is a perspective view of one of the housings employed in connection with the invention.

In the drawings, the numeral 10 indicates the front axle of a motor vehicle which may be of any desired construction and with which is associated the differential gear casing 11 in which is mounted the gearing (not shown) for driving the shaft 12.

Since the mechanism for driving each of the front wheels is identical in construction the description of one will suffice for both. The drive shaft 12 is preferably journaled within the adjacent end of the axle 10 and said shaft is provided upon its outer end with a beveled gear 13 between which and the flange 14 carried by the end of the axle are disposed the ball bearings 15. Depending from the axle 10 is an angular bracket 16 the horizontal portion 17 of which has mounted upon its free end the bearing block 18 secured in position by means of a vertically disposed rod 19 the upper end of which is passed through the horizontal portion 20 of an angular bracket 21 which is disposed upon said axle. A casting including a hub portion 22 is rotatably mounted upon the rod 19 above block 18 and has formed thereon a small beveled gear 23 and large beveled gear 24, the former meshing in the gear 13. Ball bearings 25 are interposed between the large gear 24 and the block 18 and said gear meshes with the large beveled gear 26 fixed to the hub 27 of the wheel 28. From this description it will be apparent that as the shaft 12 is driven motion will be transmitted from the gears 13, 23 and 24 to the gear 26 and from thence to said wheel thus turning the same in the desired direction.

The hub 27 has preferably secured thereto the plate 29 provided with a peripheral flange 30 surrounding the gear 26. Secured to the flange 14 of the axle 10 is a housing 31 consisting of a vertically disposed portion 32 and a horizontal portion 33, the portion 32 inclosing the gear 13 while the portion 33 has disposed therein the gear 23. The horizontal portion 33 is provided in its upper surface with a flanged opening 34 and in its lower surface with a large flanged opening 35 the flange of which engages the periphery of the hub portion 22.

A second housing 36 is associated with the gears 24 and 26 and said housing also preferably includes a vertical portion 37 and horizontal portion 38, the latter having vertically alined and flanged openings 39; the flange 40 of the upper opening having a bearing on the flange of the opening 35 in the horizontal portion 33 of the housing 31. The flange 41 of the lower opening 39 engages the bearing block 18 and it will be apparent from this description that the horizontal portion 38 of the housing 36 will be free to revolve about the bearing block 18 and hub portion 22. The vertical portion 37 of the housing 36 is provided with a centrally disposed flanged opening 42 which receives the hub 27 and is also provided with a peripheral flange 43 which engages interiorly of the flange 30 of the plate 29 thus forming a closure for the gear 26. By the use of washers or other packing between the flanges of the different openings described and the adjacent parts it will be apparent that these housings may be made to contain a lubricant.

The section of the rod 19 between the horizontal portion 20 and the gear 23 preferably has rotatably mounted thereon a sleeve member 44 the lower end of which extends through the upper opening 34 of the horizontal portion 33 and extending at right angles from this sleeve member is the spindle 45 about which the hub 27 revolves. Also extending from the intermediate portion of the sleeve 44 is an arm 46 to which is connected the steering rod 47 which, when actuated, will revolve the sleeve member 44 about the rod 19 and thus swing the hub 27 and consequently the wheel 28 in a horizontal plane, it being understood that during such swinging movement the housing 36 including the portions 37 and 38 will rotate about said rod 19 as an axis. It will thus be apparent that when the steering mechanism is operated the wheels 28 will be turned to the desired position without interfering with the driving thereof through the several gears described, the gear 26 always remaining in mesh with the gear 24 when said steering mechanism is operated.

What is claimed is:—

In a front wheel drive for motor vehicles, the combination with the front axle, of a drive shaft in said axle, a gear carried by each end of said shaft, a casting supported by said axle and formed with upper and lower beveled gears and a hub portion therebetween, the upper gear meshing with the first named gear, another gear in mesh with said lower gear and fixed to the hub of the adjacent wheel whereby power may be transmitted from said drive shaft to said wheel, housings for said gears each having vertical and horizontal sections which combine to inclose said gears, one of said housings having a bearing on said hub portion and the other housing being rotatable relative to the first named housing and having a bearing on that portion thereof which engages said hub portion, a rod extending through portions of said housings and beyond the same, a sleeve member mounted upon that portion of the rod extending beyond said housings, a spindle extending from said sleeve member and upon which said hub of the wheel is mounted, and an arm also extending from said sleeve member and connected to the steering mechanism of the vehicle whereby said sleeve member will be rotated, when the steering mechanism is operated, to swing said wheel hub and said rotatable housing about said rod as an axis.

In testimony whereof, I affix my signature in the presence of two witnesses.

FRANK L. FREEMAN.

Witnesses:
PAUL P. REIFF,
P. SCHMIDT.